E. F. SMITH.

VENEER DRIER.

APPLICATION FILED NOV. 4, 1910. RENEWED SEPT. 27, 1911.

APPLICATION FILED NOV. 15, 1911.

3 SHEETS—SHEET 1.

Reissued Dec. 19, 1911.

13,341.

Witnesses:

Wm. Ashley Kelly

Edmund Tyrone

Inventor:

Edwin F. Smith by Henry B. Williams

Attorney.

E. F. SMITH.
VENEER DRIER.

APPLICATION FILED NOV. 15, 1911.

Reissued Dec. 19, 1911.

13,341.

3 SHEETS—SHEET 2.

Witnesses:
Wm. Ashley Kelly
Bernard Gowen

Inventor:
Edwin F. Smith
by Henry B. Williams
Attorney

E. F. SMITH.
VENEER DRIER.

APPLICATION FILED NOV. 15, 1911.

3 SHEETS—SHEET 3.

Reissued Dec. 19, 1911.

13,341.

Witnesses:
Wm. Ashley Kelly
Bernard Bowen

Inventor:
Edwin F. Smith
by Henry D. Williams
Attorney.

UNITED STATES PATENT OFFICE.

EDWIN F. SMITH, OF BURDETT, NEW YORK.

VENEER-DRIER.

13,341. Specification of Reissued Letters Patent. Reissued Dec. 19, 1911.

Original No. 1,008,211, dated November 7, 1911, Serial No. 590,646. Application for reissue filed November 15, 1911. Serial No. 660,707.

*To all whom it may concern:*

Be it known that I, EDWIN F. SMITH, a citizen of the United States, residing at Burdett, in the county of Schuyler and State of New York, have invented certain new and useful Improvements in Veneer-Driers, of which the following is a specification, reference being had therein to the accompanying drawings, forming part thereof.

This invention relates to veneer driers and has for its general objects the rapid and effective drying of veneers without warping or weakening or injuring them in any manner and without imparting to them any tendency to warp.

A more particular object is the application of the drying heat equally at both sides of the veneer, but in such manner that there is no fear of clogging the machine or of subjecting the veneer to such heat as will cause the sap or gummy substances in the wood to exude and mar the surface of the veneer.

My invention aims to provide a drier of universal application—capable of drying all varieties of wood and all thicknesses of veneers.

Other objects and advantages will appear from the following description.

My invention includes heat-applying elements arranged to successively come in contact with opposite sides of the veneer and non-heating-applying pressure-applying elements arranged to press the veneer against the heat-applying elements, while the veneer is fed successively past the heat-applying elements.

My invention also includes heat-applying plates arranged to successively come in contact with the veneer and one or more pressure rollers for each plate for pressing the veneer against such plates.

My invention also includes feeding means interposed between pairs of elements of which one of each pair is a heat-applying element and the other of which is a non-heat-applying pressure-applying element.

Other features of my invention will hereinafter appear.

I shall now describe the veneer drier shown in the accompanying drawings and embodying my invention, and shall thereafter point out my invention in claims.

Figure 1:
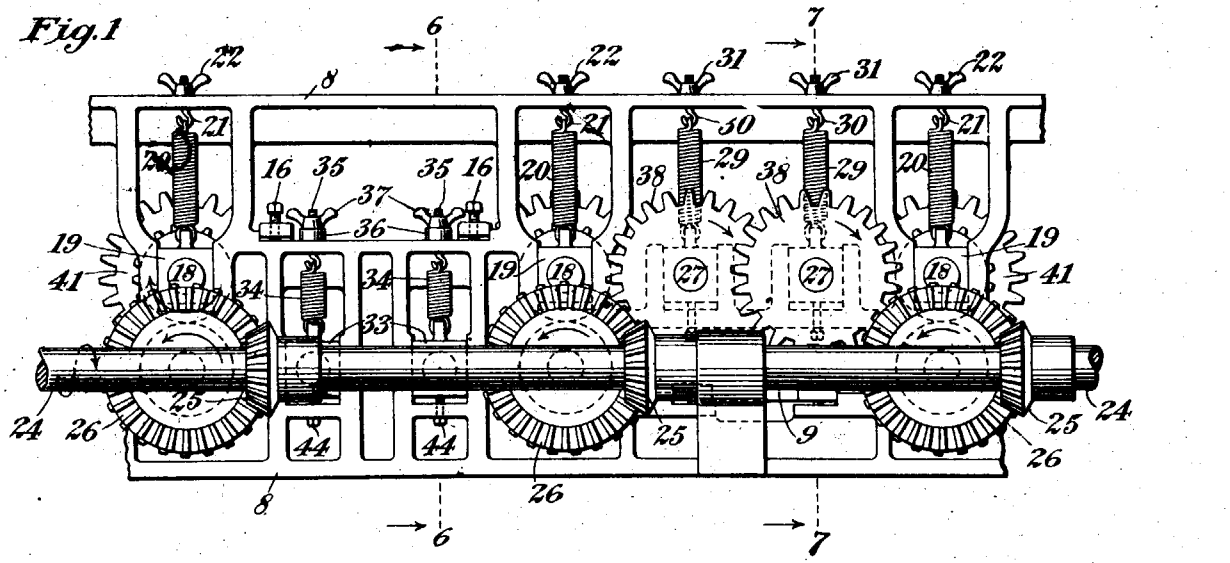
Figure 2:
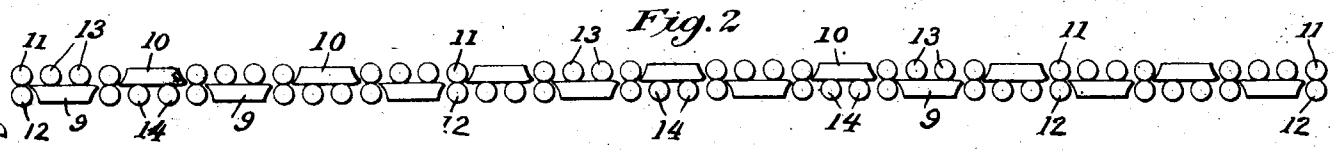
Figure 3:
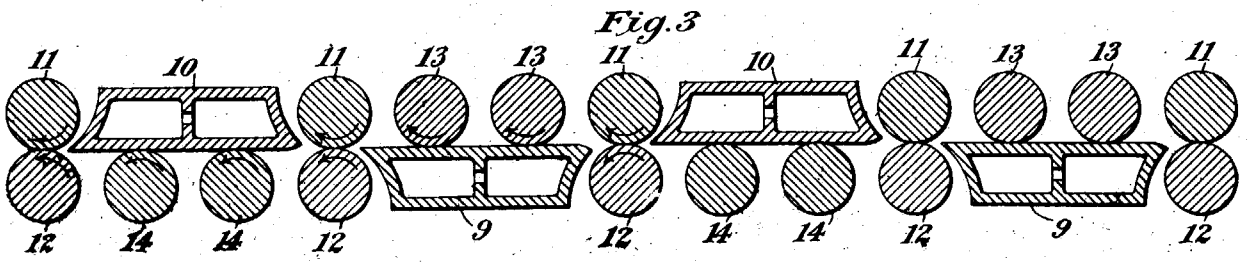
Figure 4:
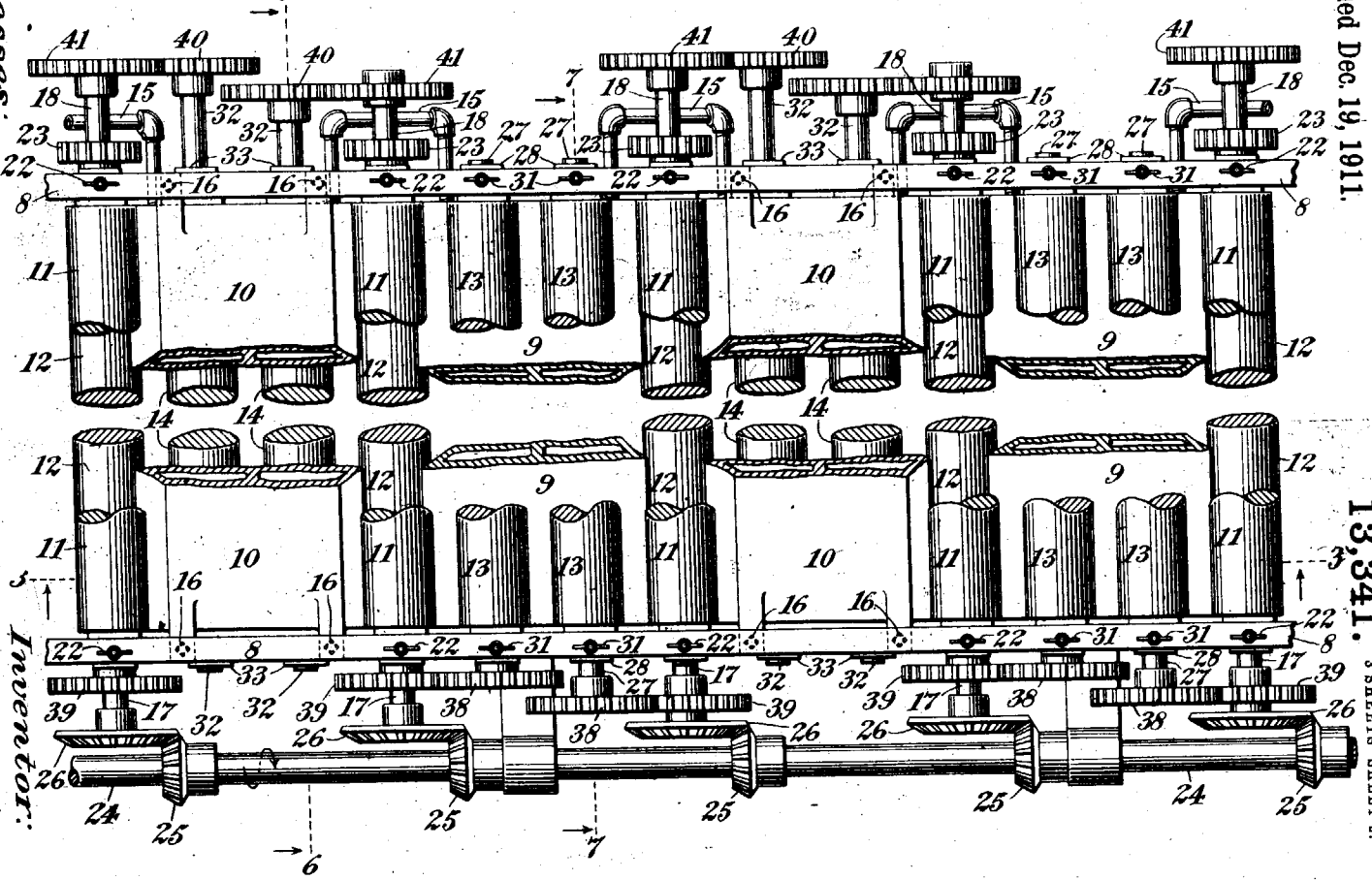
Figure 5:
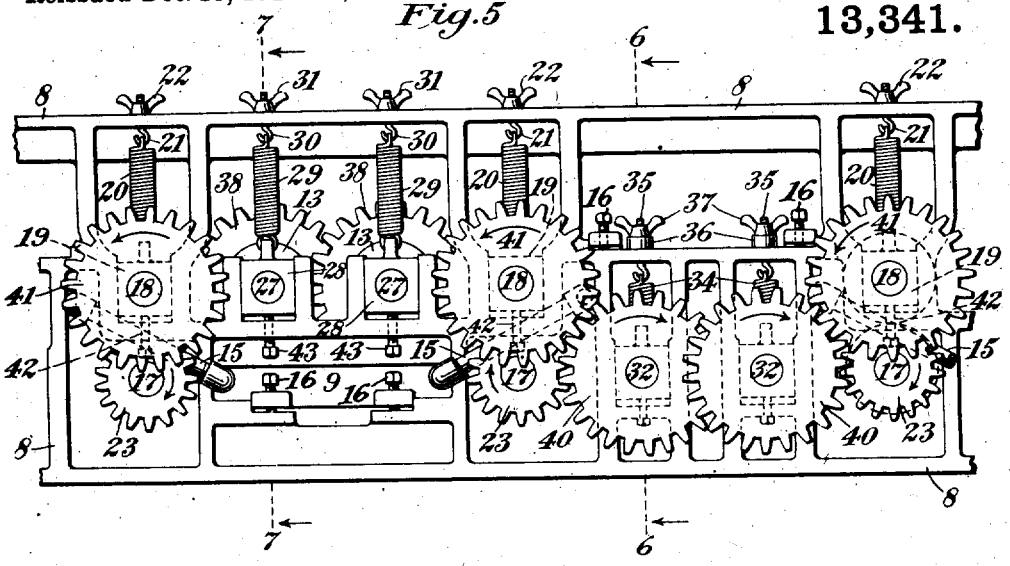
Figure 6:
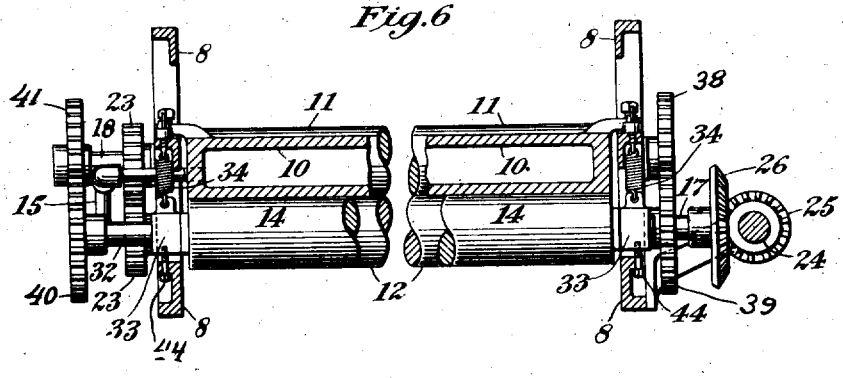
Figure 7:
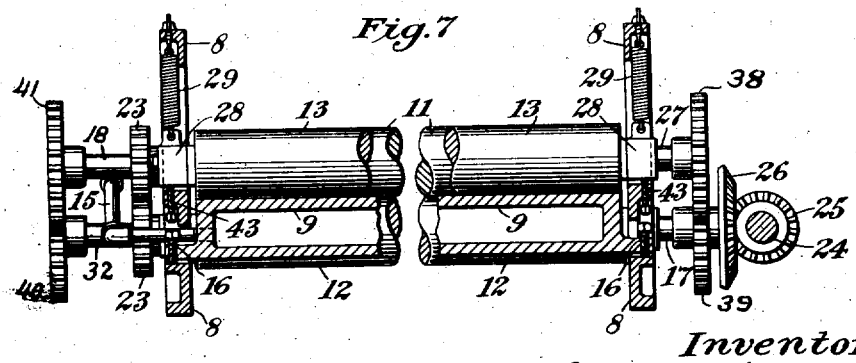

Figure 1 is a side elevation of a portion of the length of the machine. Fig. 2 is a side elevation drawn to a greatly reduced scale of the feed rollers, heat-applying plates and pressure rollers of the complete machine. Fig. 3 is a longitudinal vertical section of the same parts throughout a portion of the length of the machine, the plane of section being indicated by the line 3—3, Fig. 4, the scale being slightly smaller than that of Fig. 1. Fig. 4 is a plan view of the same portion of the length of the machine as is shown in Fig. 3, but shows all of the parts, with middle portions broken away. Fig. 5 is a view, similar to Fig. 1 and drawn to the same scale, of the side of the machine opposite to that shown in Fig. 1. Fig. 6 is a transverse vertical section on a plane indicated by the line 6—6, Figs. 1, 4, and 5, with middle portions broken away and drawn to the same scale as Figs. 3 and 4. Fig. 7 is a similar view on a different plane indicated by the line 7—7 in Figs. 1 and 4.

The machine shown has a frame work 8, which may be conveniently made up of as many longitudinally joined sections or parts as is desirable. There are lower heat-applying plates 9 and upper heat-applying plates 10. These heat-applying plates are arranged in a longitudinal series with the plates successively below and above a horizontal plane, so that the veneer is drawn first over a lower plate 9 and then under an upper plate 10, and so on successively, the drying heat being thus first applied, at one side and then at the other side of the veneer as the veneer passes through the machine from end to end. The heat-applying plates are separated longitudinally a sufficient distance to accommodate between them pairs of feed rollers 11, 12, the function of which is to carry the veneer from contact with one plate to contact with the next plate, and by positively gripping the veneer on both sides thereof to assure feeding of the veneer from plate to plate. Pairs of feed rollers are also provided at the entrance end of the machine in advance of the first plate and at the exit end of the machine beyond the last plate.

While the veneer is passing over the surface of each of the plates, it is pressed into intimate contact therewith by pressure-applying rollers, which are also actuated in unison with the feed rollers, so that they coöperate in feeding the veneer through the machine, and they are spaced apart longitudinally and in relation to the feed rollers so that they provide a series of open spaces or compartments at the sides of the veneer opposite to the sides at which the heat is applied thereto by the plates. The upper pressure-applying rollers 13 are above the lower heat-applying plates 9, and the lower pressure-applying rollers 14 are below the upper heat-applying plates 10.

Neither the feed rollers 11, 12, nor the pressure rollers 13, 14 are heat-applying rollers. They become to some extent heated in the operation of the machine, but tend to carry off the heat applied, thereby preventing over-heating of the veneer.

The heat-applying plates 9 and 10 are hollow to receive a heating fluid, which may be steam, and the heating fluid is conveyed to the plates and from plate to plate through the pipes 15. The surfaces of the heat-applying plates which are in contact with the veneer are smoothly finished and rigid surfaces. Provision is made for the adjustment of these plates by set screws 16 threaded through supporting lugs at the sides of the plates and contacting with the frame.

The feed rollers 11, 12, and the pressure rollers 13, 14 have smooth and rigid surfaces and are of considerable length, so that several widths of veneer may be fed through the machine at the same time. The lower feed rollers 12 have shafts 17 journaled in the frame 8. The upper feed rollers 11 have shafts 18 having bearings in journal boxes 19 vertically slidable in the frame, so that these rollers may move upwardly away from the lower feed rollers 12, and the upper feed rollers 11 are yieldingly supported by suspension springs 20 hung from screw hooks 21 passing through the frame and adjustable by wing nuts 22. They are adjusted to limit their downward movement by set screws 42 threaded into the frame and extending up into contact with the journal boxes 19 of these rollers. The springs 20 are adjusted to carry so much of the weight of the upper feed rollers as to limit the downward pressure of the feed rollers to the desired extent, sufficient downward pressure being necessary to hold the veneer flat and effectively feed it, but not sufficient to polish or crush it. The upper pressure rollers 13 are similarly provided with shafts 27 having their bearings in journal boxes 28 fitted to slide vertically in the frame, and these boxes are partially supported by suspension springs 29 carried by screw hooks 30 passing through the frame and adjustable by wing nuts 31. The downward limit of movement of these upper pressure rollers is determined by set screws 43 threaded through the frame and abutting against the bottoms of the journal boxes 28 which carry the rollers. The lower pressure rollers are similarly provided with shafts 32 having their bearings in journal boxes 33, which are yieldingly supported by suspension springs 34 having supporting screw hooks 35, which are adjustable by wing nuts 37 resting upon spacing collars 36. The reversal of position of these rollers, in contrast with those heretofore described calls for a lifting pressure exerted by the springs in excess of the weight of the rollers, so that the rollers will exert the desired upward pressure; and the adjusting means limit the upward movement of these rollers, and comprise adjusting screws 44 (see Fig. 6) passing loosely through the frame and threaded into the journal boxes 33 of the lower pressure rollers at the lower parts thereof.

The upper and lower feed rollers 11 and 12 are geared together to rotate in unison by deep toothed gear wheels 23 fixed on their shafts, the teeth being cut of sufficient depth to accommodate the vertical adjustment or movement of the upper feed roller. All of the feed rollers are actuated in unison by a horizontal main drive shaft 24, arranged longitudinally of the machine and provided with bevel pinions 25 meshing with bevel gears 26 on the outer ends of the lower feed roller shafts 17 at the side of the machine opposite that at which the connecting spur gears 23 of the feed rollers are located.

All of the pressure rollers are driven independently of the veneer and in unison with the feed rollers so as to supplement the action of the feed rollers and correct any tendency to clog the machine. The upper pressure rollers 13 are driven by spur gears 39 fixed on the shafts 17 of the lower feed rollers 12 and meshing with spur gears 38 fixed on the outer ends of the upper pressure roller shafts 27, each lower feed roller shaft being thus arranged to drive the adjacent upper pressure roller shaft. The depth of the teeth of these gears provides for the required adjustment of the pressure rollers. The lower pressure rollers are similarly driven from the upper feed roller shafts by spur gears 41 secured to these shafts 18 and meshing with spur gears 40 secured to the outer ends of the lower pressure roller shafts 32. Here also the teeth are of sufficient depth to accommodate the required adjustment.

In the operation of the machine, all of the rollers are rotated at the same peripheral speed and the veneer, as it passes through the machine, is fed at a uniform speed from the entrance end shown at the right in Fig. 2 to the exit end, as shown at the left in Fig. 2. The veneer has the heat applied thereto first at one side and then at the other. As the heat is applied at one side, the moisture expansively escapes from the veneer between the rollers at the opposite side of the veneer, while the rollers by their movement cause just sufficient circulation in the compartments between them to assist the escape of the moisture. The moisture is rapidly driven out and the veneer shrinks, but this shrinkage takes place uniformly throughout the mass of the veneer. There is no fear of weakening or cracking the veneer or of imparting to the veneer any tendency to warp. The veneer comes out of the machine bone dry, tough, unstained and flat.

It is obvious that various modifications may be made in the construction shown in the drawings and above particularly described within the principle and scope of my invention.

I claim:

1. A veneer drier comprising a plurality of pairs of elements, one element of each pair being a heat-applying element and the other a non-heat-applying pressure-applying element for pressing the veneer against the heat-applying element, the heat-applying elements being arranged to successively come in contact with opposite sides of the veneer, and means for feeding the veneer between the elements of the pairs.

2. A veneer drier comprising a plurality of pairs of elements, one element of each pair being a heat-applying element and the other a non-heat-applying pressure-applying element for pressing the veneer against the heat-applying element, the heat-applying elements being arranged to successively come in contact with opposite sides of the veneer, and feeding means for the veneer interposed between the pairs of elements.

3. A veneer drier comprising a series of heat-applying plates arranged so as to contact successively with opposite sides of the veneer, feed rollers for the veneer alternating with the heat-applying plates, and a pressure roller for each plate arranged oppositely to the plate for pressing the veneer against the plate.

4. A veneer drier comprising a series of heat-applying plates arranged so as to contact successively with opposite sides of the veneer, feed rollers for the veneer alternating with the heat-applying plates, and a plurality of pressure rollers for each plate arranged oppositely to the plate for pressing the veneer against the plate.

5. A veneer drier comprising a series of heat-applying plates arranged so as to contact successively with opposite sides of the veneer, feed rollers for the veneer alternating with the heat-applying plates, and a non-heat-applying pressure roller for each plate arranged oppositely to the plate for pressing the veneer against the plate.

6. A veneer drier comprising a series of heat-applying plates arranged so as to contact successively with opposite sides of the veneer, feed rollers for the veneer alternating with the heat-applying plates, and a plurality of non-heat-applying pressure rollers for each plate arranged oppositely to the plate for pressing the veneer against the plate.

7. A veneer drier comprising a plurality of pairs of elements arranged successively in series, one element of each pair being a heat-applying element and the other a non-heat-applying pressure-applying element for pressing the veneer against the heat-applying element, and feeding means for the veneer interposed between the pairs of elements.

8. A veneer drier comprising a series of heat-applying plates arranged so as to contact successively with the veneer, pairs of opposed feed rollers for the veneer alternating with the heat-applying plates, and a plurality of pressure rollers for each plate arranged oppositely to the plate for pressing the veneer against the plate.

In testimony whereof I have affixed my signature in presence of two witnesses.

EDWIN F. SMITH.

Witnesses:
CHARLES COLEMAN,
WARREN A. SPENCER.